United States Patent [19]

Kohama et al.

[11] Patent Number: 4,550,618
[45] Date of Patent: Nov. 5, 1985

[54] TORQUE DETECTOR

[75] Inventors: Tokio Kohama, Nishio; Hideki Obayashi, Okazaki; Toshikazu Ina, Nukata; Seiichi Narita, Chiryu, all of Japan

[73] Assignees: Nippon Soken, Inc., Nishio; Nippondenso Co., Ltd., Kariya, both of Japan

[21] Appl. No.: 504,425

[22] Filed: Jun. 15, 1983

[30] Foreign Application Priority Data

Jun. 17, 1982 [JP] Japan .................. 57-104118

[51] Int. Cl.⁴ ............................................. G01L 3/10
[52] U.S. Cl. .......................... 73/862.34; 73/862.36; 324/209; 364/508
[58] Field of Search .......... 73/862.19, 862.32, 862.34, 73/862.36; 324/209; 364/506, 508

[56] References Cited

U.S. PATENT DOCUMENTS

| | | | |
|---|---|---|---|
| 1,111,848 | 9/1914 | McCoy et al. | 73/862.34 |
| 3,104,544 | 9/1963 | Guiot | 73/862.32 X |
| 3,130,581 | 4/1964 | Schulman | 73/862.19 |
| 3,295,367 | 1/1967 | Rundell | 73/862.34 |
| 3,529,460 | 9/1970 | Marcus | 73/862.32 |
| 3,844,169 | 10/1974 | Whitehouse | 73/862.32 X |
| 4,136,559 | 1/1979 | Brown | 73/862.34 |
| 4,208,904 | 6/1980 | Schindler | 73/862.34 |
| 4,352,295 | 10/1982 | Maehara et al. | 73/862.34 |
| 4,444,063 | 4/1984 | Snowden et al. | 73/862.34 |
| 4,444,064 | 4/1984 | Wolfinger | 73/862.34 |

FOREIGN PATENT DOCUMENTS

| | | | |
|---|---|---|---|
| 157861 | 9/1982 | Japan | 73/862.34 |
| 163867 | 10/1982 | Japan | 73/862.19 |
| 503151 | 4/1976 | U.S.S.R. | 73/862.34 |
| 694778 | 10/1979 | U.S.S.R. | 73/862.34 |
| 838435 | 6/1981 | U.S.S.R. | 73/862.38 |
| 974156 | 11/1982 | U.S.S.R. | 73/862.34 |

Primary Examiner—Robert Spitzer
Attorney, Agent, or Firm—Cushman, Darby & Cushman

[57] ABSTRACT

A torque detector, particularly a torque detector for detecting a torque applied to a torque transmission shaft which is connected to a load such as a wheel of an automobile, has a driving member connected to an engine, a driven member connected to a load and driven by the driving member to be rotated, an elastic member for connecting the driving member to the driven member, a transmission for varying the rotating speed ration of the engine to the load, which is provided in the driving member or the driven member, electromagnetic pickups for detecting the angular phase difference between the driving member and the driven member which is produced due to the deformation of the elastic member, a rotating speed ratio counting circuit for detecting the rotating speed ratio of the engine to the load, which is controlled by the transmission, and a microcomputer for calculating engine torque and load driving torque from the rotating speed ratio detected by the rotating speed ratio counting circuit and the angular phase difference detected by the electromagnetic pickups.

8 Claims, 13 Drawing Figures

SMALL ←— TORQUE —→ LARGE

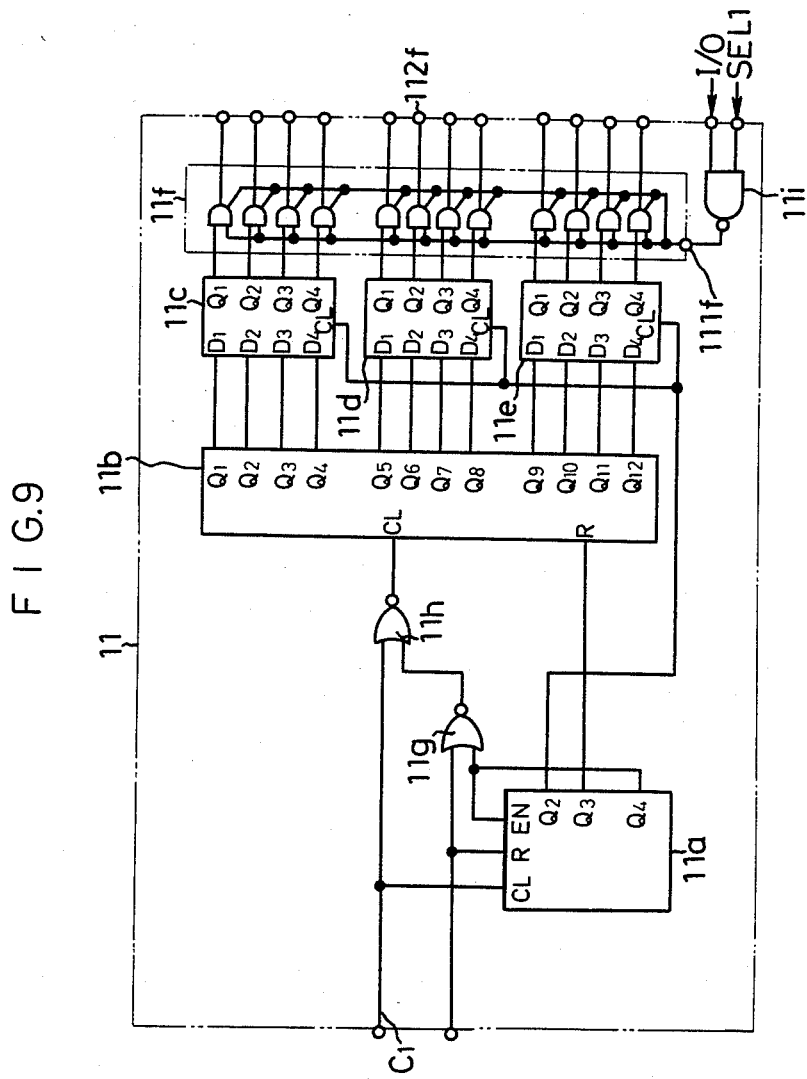
F I G. 9

TORQUE DETECTOR

BACKGROUND OF THE INVENTION

The present invention relates to a torque detector, particularly to a torque detector for detecting a torque applied to a torque transmission shaft which is connected to a load such as a wheel of an automobile.

The conventional torque detector of this type is provided with a detector shaft of which one end is connected to a driving shaft of an engine and the other end is connected to the torque transmission shaft. In this torque detector, the torque applied to the torque transmission shaft is detected by detecting the distortion occurring in the above detector shaft.

The distortion of the above shaft is detected by a detecting means of a strain gauge type comprising a strain gauge of which electric resistance varies in proportion to the distortion, of a magnetic strain type comprising a magnetic strain pipe of which magnetic property varies in accordance with the distortion or of a phase difference type, which detects a phase difference between the distortion occurring at two separated points of the detector shaft.

In the conventional torque detector, applied torque is detected by detecting distortion occurring in the detector shaft so that the detector shaft must be made long in order to improve the accuracy of detection. As a result, the conventional torque detector becomes too large to be mounted on the automobile practically.

It has been required to control the engine and a transmission of the automobile in accordance with the applied torque. Namely, it has been required to control the air-fuel ratio and the ignition timing of engine by detecting the engine torque, to select the most suitable transmission ratio of transmission by detecting the load driving torque which is transmitted to the load side through the transmission, and to select such a transmission timing as to reduce shock to a minimum by detecting both of the engine torque and the load driving torque.

SUMMARY OF THE INVENTION

The torque detector of the present invention comprises a driving member connected to an engine, a driven member connected to a load and driven by the driving member to be rotated, an elastic member for connecting the driving member to the driven member, a transmission means for varying the rotating speed ratio of the engine to the load, which is provided in the driving member or the driven member, an angular phase difference detecting means for detecting the angular phase difference between the driving member and the driven member, which is produced due to the deformation of the elastic member, a rotating speed ratio detecting means for detecting the rotating speed ratio of the engine to the load, which is controlled by the transmission means, and a torque processing means for calculating engine torque and load driving torque from the rotating speed ratio detected by the rotating speed ratio detecting means and the angular phase difference detected by the angular phase difference detecting means.

In the torque detector of the present invention, the elastic member deforms in accordance with the applied load so that the angular phase difference occurs between the driving member and the driven member. At this time, the rotating speed of the load which is connected to the engine through the transmission means becomes different from that of the engine. By detecting the above described angular phase difference and the ratio of the rotating speed of the engine to that of the load, the engine torque and the load driving torque can be detected.

One object of the present invention is to provide a torque detector which is small in size and simple in structure enough to be mounted on an automobile.

Another object of the present invention is to provide a torque detector which detects torque with excellent accuracy.

Still another object of the present invention is to provide a torque detector by which both of engine torque and load driving torque can be detected.

DESCRIPTION OF THE DRAWINGS

FIG. 9 is a circuit diagram of the rotating speed counting circuit;

DETAILED DESCRIPTION OF THE EMBODIMENTS

Hereinafter, the present invention will be explained in detail in accordance with the embodiments thereof with reference to the accompanying drawings.

Figure 1:
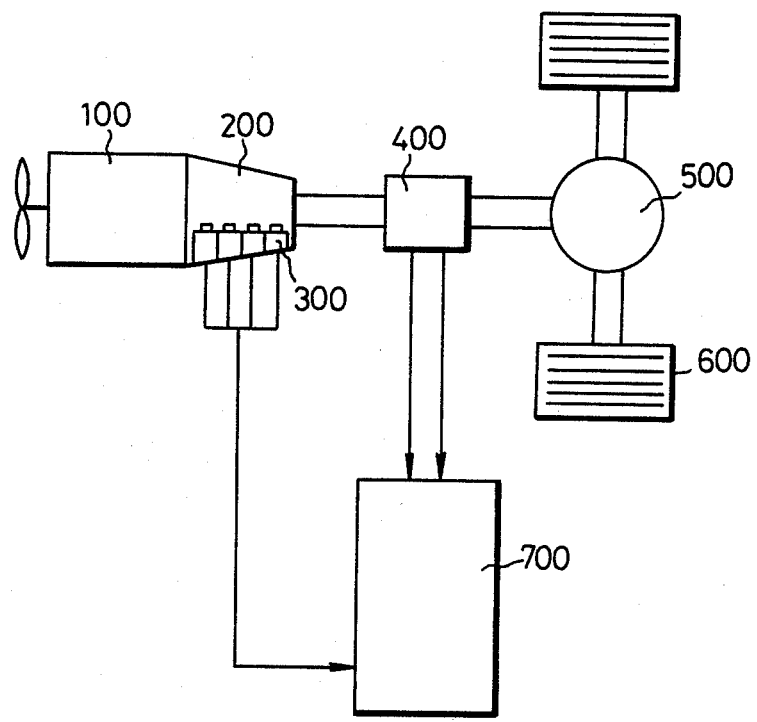
FIG. 1 is a schematic view of a drive system for automobile, provided with a torque detector according to the present invention.

FIG. 1 is a schematic view of a drive system for automobile, provided with a torque detector according to the present invention.

In FIG. 1, the reference numeral 100 designates an internal combustion engine of an automobile, 200 designates a transmission connected to the output shaft of the engine 100, 400 designates a torque detector, 500 designates a final gear, 600 designates driving wheels, and 700 designates a data processing means.

Figure 2:
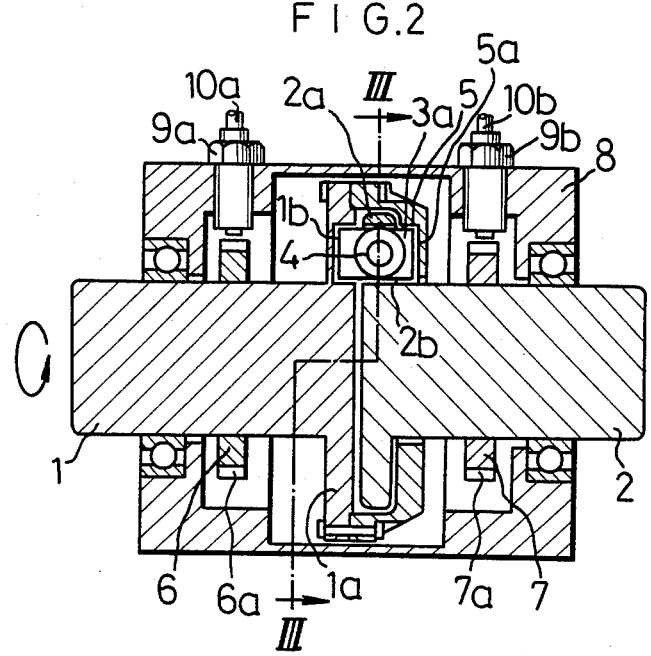
FIG. 2 is a longitudinal sectional view of one embodiment of a torque detector according to the present invention taken along the line II—II of FIG. 3.
Figure 3:
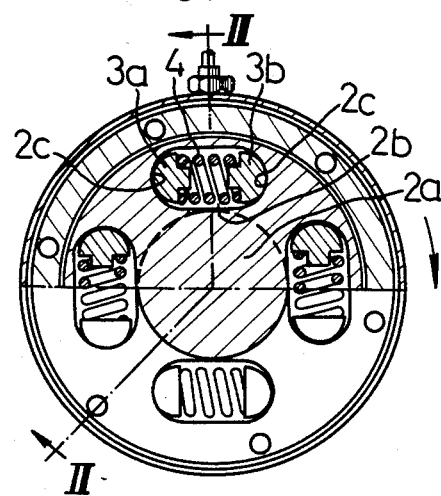
FIG. 3 is a transverse sectional view taken along the line III—III of FIG. 2.
Figure 4:
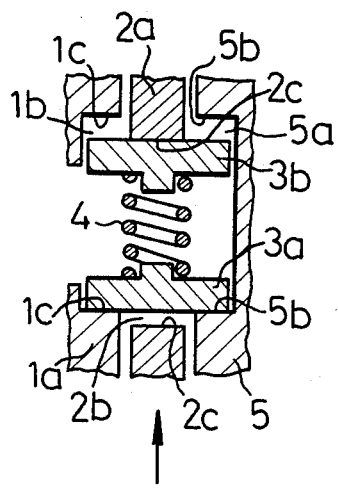
FIG. 4 is a longitudinal sectional view of an elastic member shown in FIG. 3.

FIGS. 2 to 4 illustrate a first embodiment of the torque detector according to the present invention.

Shafts 1, 2 are coaxially arranged within a casing 8 so as to be opposed to each other and they are rotatably supported thereby.

The shaft 1 is driven by the engine 100 while one end of the shaft 2 is connected to a load outside of the casing 8.

A thick walled flange 2a is formed in the other end of the shaft 2 so as to be opposed to the other end of the shaft 1.

In the flange 2a, four long holes 2b extending in the circumferential direction are formed at equal angular distances.

Spring receiving members 3a, 3b having a semicircular cross section and an axial length larger than the thickness of the flange 2a, are closely inserted into both ends of each of the long holes 2b so as to project on both sides of the flange 2a.

A coil spring 4 is arranged within each of the long holes 2b and both ends thereof are supported by a flat surface of each of the spring receiving members 3a, 3b. The curved surface of each of the receiving members 3a, 3b slidably contacts with the wall 2c defining each of the end portions of the long hole 2b.

In the other end of the shaft 1, a flange 1a is formed so as to be opposed to the flange 2a of the shaft 2. And grooves 1b are formed in the flange 1a so as to be opposed to the long holes 2b formed in the flange 2a.

A coupling flange 5 is fixed to the outer periphery of the flange 1b by means of rivets so as to cover the flange 2a.

In the coupling ring 5, grooves 5a are formed so as to be opposed to the grooves 1b of the flange 1a through the long holes 2b.

Both end portions of each of the receiving members 3a, 3b, which project on both sides of the flange 2a, are inserted into the grooves 5a, 1b.

To the outer periphery of the shafts 1, 2, annular plates 6, 7 are fixed, respectively. In the outer peripheral surface of each of the annular plates 6, 7, a plurality of teeth 6a, 7a are formed at equal angular distances.

Electromagnetic pickups 9a, 9b are provided in the casing 8 so as to be opposed to the teeth 6a, 7a, respectively. The pickups 9, 10 detect the passing of the teeth 6a, 7a and generate electrical signals. The generated electrical signals are supplied to a pulse phase difference detecting circuit described after by way of lead wires 10a, 10b.

Furthermore, a transmission position detecting means 300 for detecting the transmission position of the transmission 200 is mounted on the transmission 200 as shown in FIG. 1. The transmission position detecting means 300 is composed of switches of which the number is equal to that of the transmission positions. When one transmission position is selected, the switch corresponding to the selected transmission position is closed.

In operation, when the shaft 1 is rotated in the direction of arrow in FIGS. 1 to 3, the coupling flange 5 also rotates with the shaft 1. One end surface 1c of each of the grooves 1b formed in the flange 1a of the shaft 1 and one end surface 5b of each of the grooves 5a formed in the coupling flange 5 push the receiving members 3a as shown in FIG. 3. This pushing force is transmitted to the receiving members 3b through the coil springs 4. The receiving members 3b push the wall 2c of the flange 2a of the shaft 2 to rotate the shaft 2 in the same direction as the rotating direction of the shaft 1.

When the load of the shaft 2 is small, the deforming amount of each spring 4 is small and as the load of the shaft 2 increases, the deforming amount of each spring 4 increases in proportion thereto.

Due to this deformation of the coil springs 4, a phase difference occurs between the shaft 1 and the shaft 2. This phase difference varies in proportion to the deforming amount of the spring 4, that is a torque applied to the load side.

This phase difference is detected by the electromagnetic pickups 9a, 9b which are opposed to the teeth 6a, 7a formed in the annular members 6, 7.

When the shaft 1 rotates, the pickup 9a generates alternating voltage due to the change of magnetic resistance arising when the teeth 6a of the annular plate 6 pass the pickup 9a. The pickup 9a also generates alternating voltage.

Figure 5:
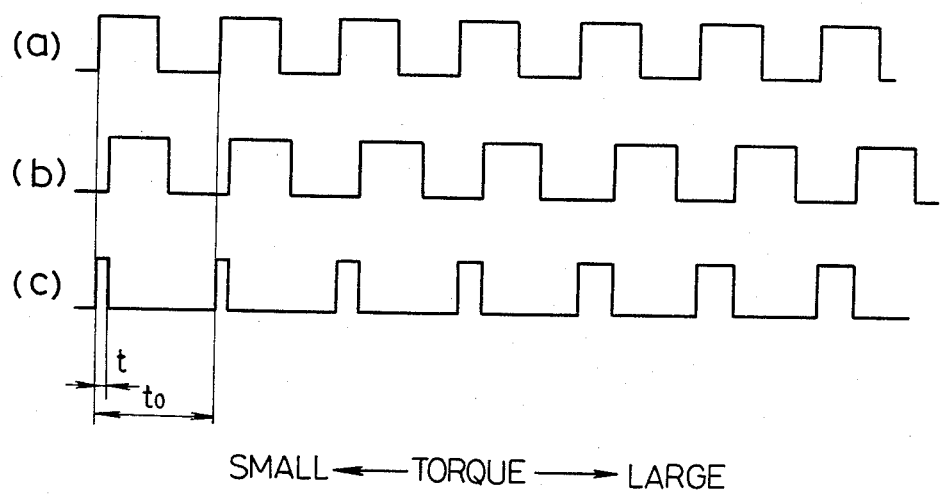
FIG. 5 is a wave form diagram of output signals.

FIG. 5(a) shows a pulse signal which is obtained by wave-shaping the alternating voltage signal generated by the pickup 9a and FIG. 5(b) shows a pulse signal which is obtained by wave-shaping the alternating voltage signal generated by the pickup 9b. When torque is applied, the phase of the alternating voltage signal from the pickup 9b delays from that of the alternating voltage signal from the pickup 9a in response to the applied torque. By detecting the phase difference between the pulse signal (a) and the pulse signal (b), a torque signal shown by (c) is obtained.

The period ($t_0$) of the pulse signal (c) is constant when the rotating speed of each of the shafts 1, 2 is constant. The time width (t) of the pulse signal (c) changes in proportion to the phase difference between the pulse signals (a), (b), namely, the applied torque.

Hereinafter, the data processing means 700 will be explained.

Figure 6:
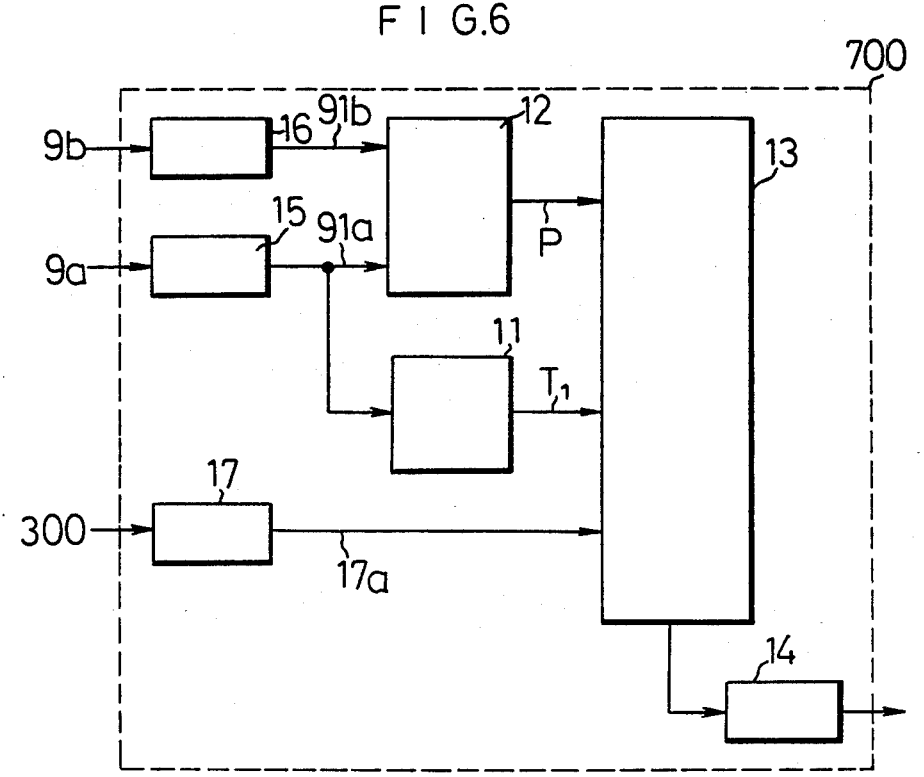
FIG. 6 is a block diagram of the angular phase difference detecting and the data processing means of the torque detector according to the present invention.

FIG. 6 is a block diagram of the angular phase difference detecting and the data processing means (700) of the present invention.

A rotating speed counting circuit 11 is electrically connected to the electromagnetic pickup 9a and a phase difference detecting circuit 12 is electrically connected to the electromagnetic pickups 9a, 9b.

The rotating speed counting circuit 11 and the phase difference detecting circuit 12 are electrically connected to a microcomputer 13 as the data processing circuit, respectively. And the data processing circuit 13 is electrically connected to an indicating circuit 14.

The reference numerals 15, 16, 17 designate wave-shaping circuits.

In operation, the output signal 91a detected by the pickup 9a and wave-shaped by the circuit 16 is fed to the rotating speed counting circuit 11 while the output signals 91a, 91b detected by the pickups 9a, 9b and wave-shaped by the circuits 15, 16 are fed to the phase difference detecting circuit 12.

The output signal of the transmission position detecting means 300 is wave-shaped by the circuit 17 and switch data 17a is supplied to the data processing circuit 13.

The rotating speed counting circuit 11 feeds digital data $T_1$ which is proportional to the period of the output signal 91a and is inversely proportional to the rotating speed N, to the data processing circuit 13.

The phase difference detecting circuit 12 feeds digital data P which is proportional to the phase difference between the output signals 91a, 91b, to the data processing circuit 13.

The data processing circuit 13 calculates the torque from the data $T_1$, P and 17a, and the obtained torque is indicated by the display circuit 14.

Figure 7:
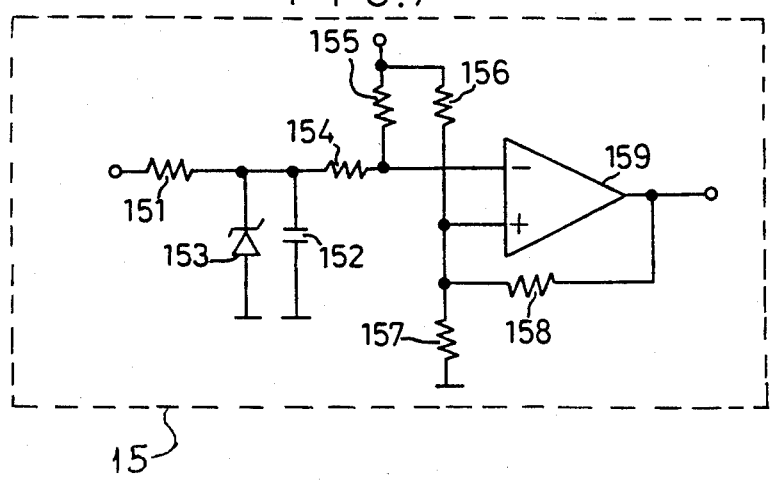
FIG. 7 is a circuit diagram of a wave-shaping circuit 15.

As shown in FIG. 7, the wave-shaping circuit 15 comprises a low-pass filter composed of a resistor 151, a condensor 152 and a zenor diode 153, and a comparator circuit composed of resistors 154, 155, 156, 157, 158 and a comparator 159.

To each of the inverting input terminal (−) and the non-inverting input terminal (+) of the comparator 159, bias voltage nearly equal to each other, is applied. The comparator 159 is provided with a positive feedback resistor 158 in order to make the rising and the falling of the output pulse signal sharp.

Figure 8:
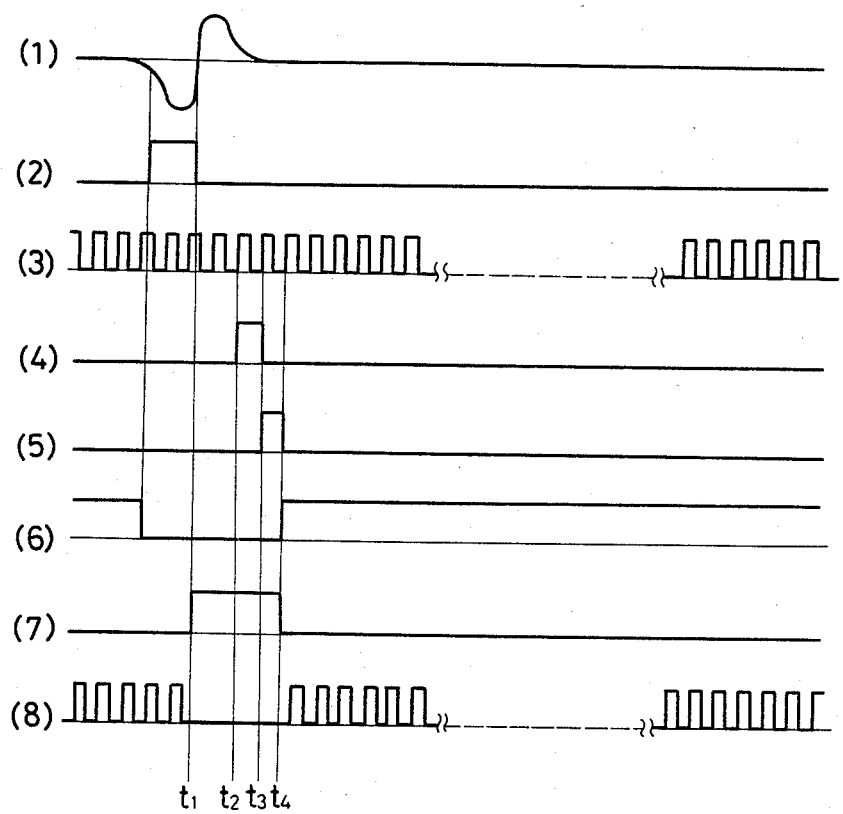
FIG. 8 is a wave form diagram showing the operation timing of a rotating speed counting circuit.

When the alternate voltage signal shown in FIG. 8(1) is fed from the pickup 9a to the pulse-shaping circuit 15, the comparator 159 generates the timing pulse signal having such a waveform as shown in FIG. 8(2).

The wave-shaping circuit 16 has the same construction as that of the circuit 15.

FIG. 9 is a circuit diagram of the rotating speed counting circuit 11.

The reference numerals 11a, 11b designate counters, 11c, 11d, 11e designate shift resistors and 11f designates a three-state buffer.

The counter 11a comprises a clock terminal CL, a reset terminal R, a counter enable terminal EN, and output terminals $Q_2$ to $Q_4$.

The output terminal $Q_4$ is connected to the counter enable terminal EN.

To the clock terminal CL, a clock pulse signal $C_1$ is applied and the counter 11a counts the clock pulse signal $C_1$. When the output signal from the output terminals $Q_4$ is "1" level, the "1" level signal is fed to the counter enable terminal EN to stop the counting operation of the counter 11a.

Figure 11:
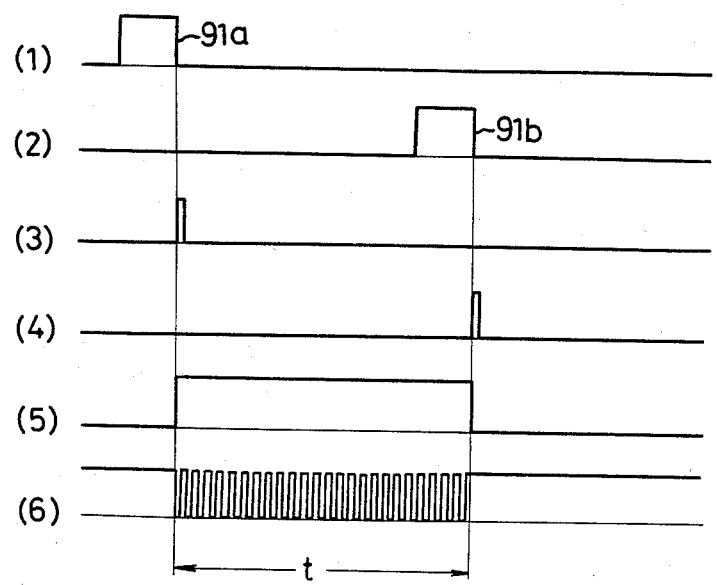
FIG. 11 is a wave form diagram showing the operation timing of the phase difference detecting circuit.

When the signal 91a shown in FIG. 11 is fed to the reset terminal R, the counter 11a is reset so that the output signal from the output terminal $Q_4$ is changed into "0" level as shown in FIG. 8(6).

When the signal 91a is changed into "0" level, the counter 11a starts the counting operation to generate the pulse signals shown in FIG. 8(4), 8(5) from the output terminals $Q_2$, $Q_3$ in order.

When the output signal from the output terminal $Q_4$ is turned "1" level, the counter 11a stops the counting operation, again.

The counter 11b comprises a clock terminal CL, a reset terminal R and output terminals $Q_1$ to $Q_{12}$ which are electrically connected to input terminals $D_1$ to $D_4$ of each of shift resistors 11c, 11d, 11e, respectively.

The output signal from the output terminal $Q_4$ of the counter 11a and the signal 91a are fed to a NOR gate 11g and the NOR gate 11g feeds a pulse signal shown in FIG. 8(7) to a NOR gate 11h.

The clock pulse signal $C_1$ shown in FIG. 8(3) is also fed to the NOR gate 11h. The NOR gate 11h feeds a pulse signal shown in FIG. 8(8) to the clock terminal CL of the counter 11b.

The output signal from the output terminal $Q_3$ of the counter 11a is fed to the reset terminal R of the counter 11b.

The output signal from the output terminal $Q_2$ of the counter 11a is fed to a clock terminal CL of each of the shift resistors 11c, 11d, 11e.

The counter 11b stops the counting operation at the time $t_1$ when the signal 91a shown in FIG. 11 is changed into "0" level and the output signal from the NOR gate 11g shown in FIG. 8(7) is changed into "1" level.

Thereafter, the output signal from the output terminals $Q_1$ to $Q_{12}$ of the counter 11b are temporally memorized by the shift resistors 11c to 11e at the time $t_2$ when the output signal from the output terminal $Q_2$ of the counter 11a is changed into "1" level.

Next, at the time $t_3$ when the output signal from the output terminal $Q_3$ of the counter 11a is changed into "1" level, the counter 11b is reset and at the time $t_4$ when the output signal from the output terminal $Q_4$ of the counter 11a is changed into "1" level, the counter 11b starts the counting operation, again.

The counter 11b continuously feeds output signals (counted data) to the shift resistors 11c, 11d, 11e so as to synchronize with the output signal 91a from the pickup 9a. Each of the shift resistors 11c to 11e feeds digital data $T_1$ which is proportional to the pulse period of the output signal 91a, namely the reciprocal of rotating speed (1/N) of the shaft 1, from the output terminals $Q_1$ to $Q_4$ to a three-state buffer 11f.

The control terminal 111f of the three-state buffer 11f is connected to a NAND gate 11i.

To the NAND gate 11i, an input and output control signal (hereinafter will be called I/O signal) and a device select signal (SEL 1) are applied from a device control unit (DCU) of the microcomputer 13.

When the output signal of the NAND gate 11i is changed into "0" level, digital data $T_1$ which is proportional to the reciprocal of rotating speed is fed from the output terminals 112f to the microcomputer 13.

In this circuit, a well known quartz clock of about 524 $KH_3$ is used to feed a clock pulse signal.

Figure 10:
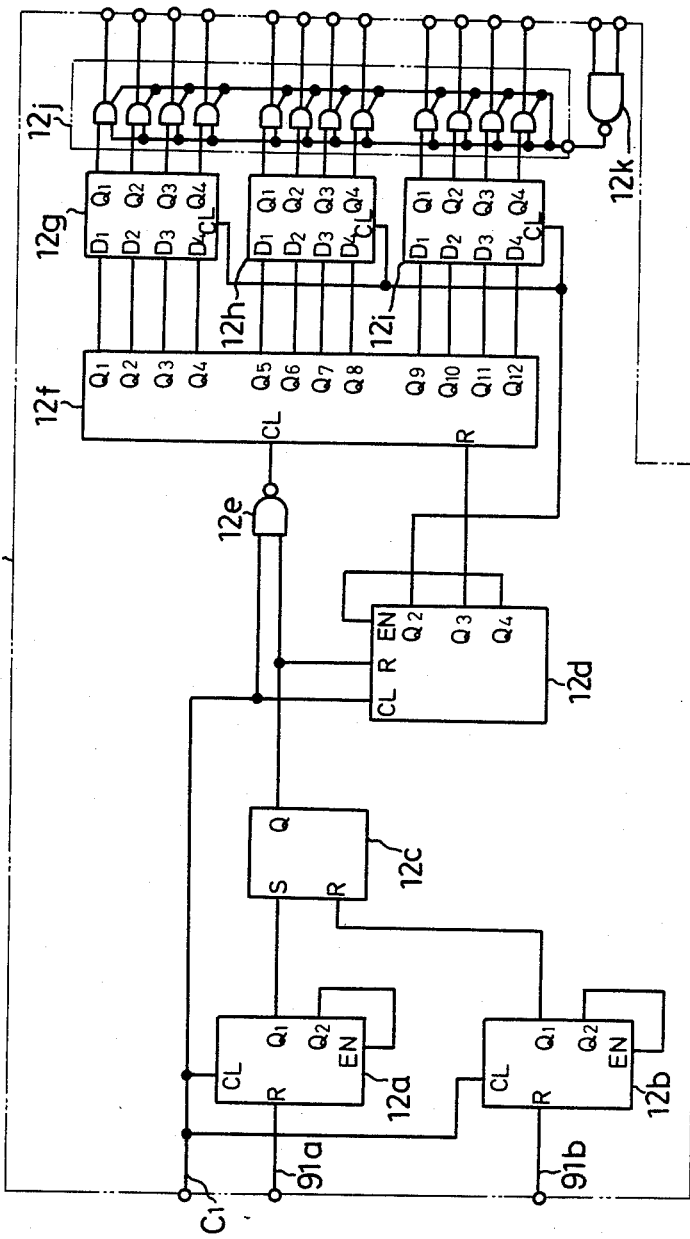
FIG. 10 is a circuit diagram of a phase difference detecting circuit.

FIG. 10 is a circuit diagram of the phase difference detecting circuit 12.

The reference numerals 12a, 12b, 12d, 12f designate counters, 12c designates a R-S flipflop, 12g, 12h, 12i designate shift resistors and 12j designates a three-state buffer.

The sign-ls 91a, 91b shown in FIG. 11(1), 11(2) are fed to the reset terminals R of the counters 12a, 12b, respectively. The counters 12a, 12b feed pulse signals shown in FIG. 11(3), 11(4) from the output terminals $Q_1$ thereof to the S terminal and the R terminal of the R-S flipflop 12c, respectively.

The R-S flipflop 12c feeds a pulse signal shown in FIG. 11(5) of which "1" level is kept for a time t corresponding to the phase difference between the signals 91a, 91b, from the output terminal Q to the NAND gate 12e.

While the pulse signal from the R-S flipflop 12c is "1" level, the NAND gate opens to feed a clock pulse signal $C_1$ shown in FIG. 11(6) to the clock terminal CL of the counter 12f.

Next, the shift resistors 12g to 12i, the three-state buffer 12j and a NAND gate 12k operate in the same manner as explained on the operation of the rotating speed counting circuit 11 to feed digital data P which is proportional to the time t corresponding to the phase difference between the output signals 91a, 91b, to the microcomputer 13.

Figure 13:
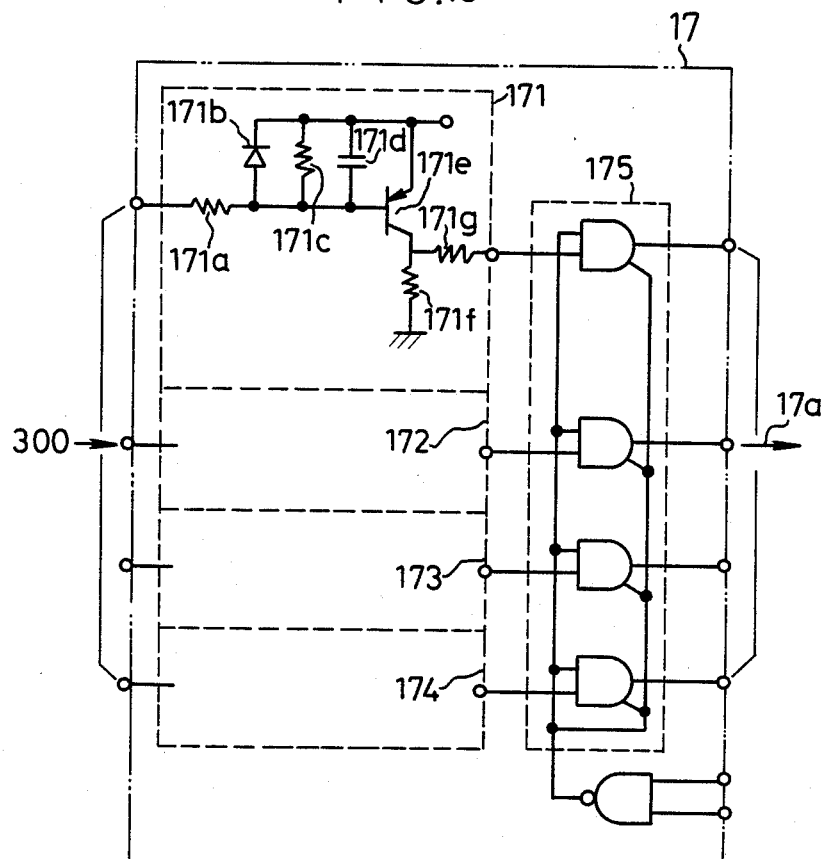
FIG. 13 is a circuit diagram of a wave shaping circuit 17.

The wave-shaping circuit 17 is shown in FIG. 13. The wave-shaping circuit 17 shapes each of the output signals which are generated by the transmission position detecting means 300 in response to the transmission positions of the transmission 200, and feeds switch data 17a to the microcomputer 13.

In this embodiment, four output signals are fed to the wave-shaping units 171, 172, 173, 174 of the wave-shaping circuit 17, respectively. The wave-shaping units 171 to 174 have the same structure as one another.

The composition of only the unit 171 is shown in FIG. 13 as a representative thereof. The unit 171 is composed of resistors 171a, 171c, 171f, 171g, a condensor 171d and a transistor 171e.

The switch data 17a of four bit is fed to the microcomputer 13 through a three-state buffer 175.

The microcomputer 13 memorizes the digital data $T_1$ which is applied from the rotating speed counting circuit 11 and the digital data P which is applied from the phase difference detecting circuit 12 in an inside memory (RAM) every period determined by the program thereof.

Then, the microcomputer 13 calculates the torque from the memorized data.

The microcomputer 13 needs not operate so as to synchronize with the rotating speed counting circuit 11 and the phase difference detecting circuit 12 since each of the circuits 11, 12 is provided with a latch circuit.

In order to improve the responsibility, the microcomputer 13 may be operated so as to receive input signal when the circuits 11, 12 receive input signals.

Figure 12:
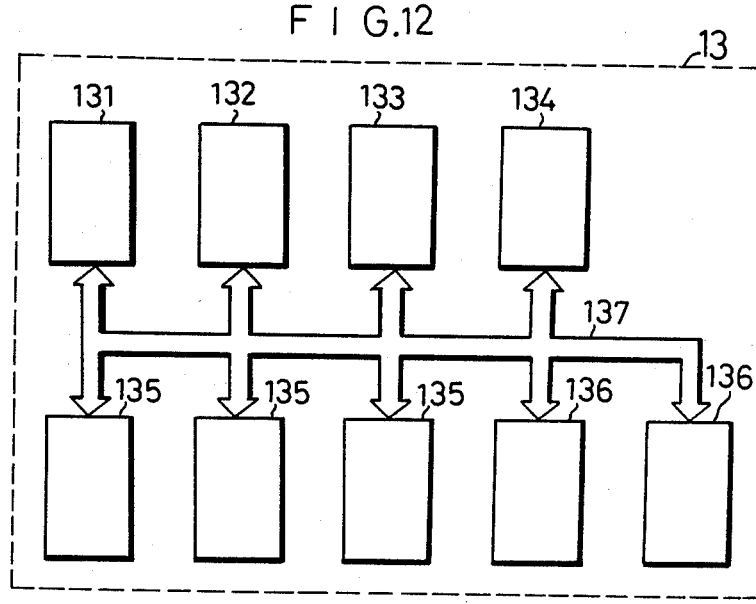
FIG. 12 is a block diagram of a microcomputer.

The construction of the microcomputer 13 is shown in FIG. 12. In FIG. 12, the reference numeral 131 designates a central processing unit, 132 designates an interruption latch unit, 133 designates a memory controlling unit, 134 designates an input and output signal controlling unit, 135 designates RAM and 136 designates ROM. They are connected to one another by means of a bus line 137.

According to this embodiment, a 7 segment LED is used as the display circuit 14. The 7 segment LED digitally displays the value of torque, which is calculated by the microcomputer 13.

Hereinafter, the data processing operation of the microcomputer 13 will be explained. The angular phase difference $\theta$ is expressed by the following equation:

$$\theta = \frac{1}{T_1} \cdot P = N \cdot P$$

wherein P is a pulse phase difference data which is detected by the phase difference detecting circuit 12, $T_1$ is the pulse period data which is supplied from the rotating speed counting circuit 11 and N is the average rotating speed.

The load driving torque $T\angle$, that is the load side torque of the transmission 200, is expressed by the following equation:

$$T\angle = K\theta$$

wherein K is a proportion constant.

The microcomputer 13 detects the transmission position of the transmission 200 from the switch data 17a supplied from the transmission position detecting means 300 through the wave-shaping circuit 17 and calculates the engine torque TM, that is the input side torque of the transmission 200, which is expressed by the following equation:

$$TM = T\angle \cdot \frac{1}{G}$$

wherein G is the transmission ratio which is predetermined in each of the transmission positions.

The load driving torque $T\angle$ and the engine torque TM, which are calculated by the microcomputer 13, respectively in the above described processes, are supplied to the display circuit 14 and displayed thereby.

As described above, according to the torque detector of the present invention, the load driving torque and the engine torque can be detected at the same time. By detecting the load driving torque, the most suitble transmission ratio can be selected, by detecting the engine torque, the air-fuel ratio and the ignition timing of engine can be controlled and by detecting both of the load driving torque and the engine torque, such a transmission timing as to reduce shock to a minimum can be selected.

In the above embodiment, the torque detector 400 is provided between the transmission 200 and the final gear 500. Instead, the torque detector 400 may be provided in a clutch portion between the engine 100 and the transmission 200. In this case, the torque detector 400 directly detects the engine torque TM. The data processing means 700 calculates the load driving torque $T\angle$ from the engine torque TM and the tansmission ratio G in accordance with the following equation:

$$T\angle = TM \cdot G$$

The torque detector of the present invention can be also provided in an automatic transmission. In this case, as the tansmission position detecting means, means for detecting the difference between the rotating speed of an input shaft of the transmission and that of an output shaft thereof can be employed. In the case of electrically controlled automatic transmission, means for detecting the output signal of the control computer can be employed as the transmission position detecting means. In addition, the torque detector of the present invention can be applied to a continuously variable transmission.

The angular phase of each of the shafts 1, 2 can be detected electromagnetically or photoelectrically. In addition, an oscillator or a semiconductor can be also employed.

As described above, according to the present invention, the engine torque and the load driving torque can be detected so that effective engine drive control can be achieved.

What is claimed is:

1. A torque detector comprising:
   a driving member connected to an engine;
   a driven member connected to a load and driven by said driving member to be rotated;
   an elastic member for connecting said driving member to said driven member;
   a transmission means for varying the rotating speed ratio of said engine to said load, which is provided in said driving member or said driven member;
   an angular phase difference detecting means for detecting the angular phase difference between said driving member and said driven member, which is produced due to the deformation of said elastic member;
   a rotating speed ratio detecting means for detecting the rotating speed ratio of said engine to said load, which is controlled by said transmission means; and
   a torque processing means for calculating engine torque and load driving torque from the rotating speed ratio detected by said rotating speed ratio detecting means and the angular phase difference detected by said angular phase difference detecting means.

2. A torque detector according to claim 1, wherein:
   in one end of said driving member, a flange is formed and in one end of said driven member, a flange is formed so as to be opposed to said flange of said driving member;
   each of said flanges is provided with a plurality of elastic member receiving portions, each of which is opposed to each of elastic member receiving portions of the opposed flange; and both ends of each of said elastic members are received by said opposed elastic member receiving portions formed in said opposed flanges.

3. A torque detector according to claim 2, wherein:
said elastic member is made of rubber or spring.

4. A torque detector according to claim 2, wherein:
said angular phase difference detecting means comprises:

two annular plates which are coaxially disposed around said driving member and said driven member, respectively;

each of said annular plates being provided with at least one tooth or notch in the outer periphery thereof at a predetermined angular position;

a pulse generating means for generating pulse signals upon detecting the passing of said tooth or notch, which is disposed so as to be opposed to the outer periphery of each of said annular plates;

a pulse phase difference detecting circuit for detecting pulse phase difference between said pulse signals;

a rotating speed counting circuit for counting rotating speed of said engine; and a processing circuit for calculating angular phase difference between said driving member and said driven member from the pulse phase difference and the rotating speed of said engine.

5. A torque detector according to claim 1, wherein:
said driving member is composed of a first driving shaft connected to said engine, and a second driving shaft connected to said driven member through said elastic member; and said transmission means is disposed between said first driving shaft and said second driving shaft.

6. A torque detector according to claim 5, wherein:
said torque processing means comprises:

a load driving torque processing means for calculating load driving torque from the angular phase difference between said driving member and said driven member which is detected by said angular phase difference detecting means; and an engine torque processing means for calculating engine torque from the calculated load driving torque and the rotating speed ratio of said first driving shaft to said second driving shaft which is detected by said rotating speed ratio detecting means.

7. A torque detector according to claim 1, wherein:
said driven member is composed of a first driven shaft connected to said driving member through said elastic member, and a second driven shaft connected to said load; and said transmission means is disposed between said first driven shaft and said second driven shaft.

8. A torque detector according to claim 7, wherein:
said torque processing means comprises:

an engine torque processing means for calculating engine torque from the angular phase difference between said driving member and said driven member which is detected by said angular phase difference detecting means; and a load driving torque processing means for calculating load driving torque from the calculated engine torque and the rotating speed ratio of said first driven shaft to said second driven shaft.

* * * * *